March 10, 1970

HISASHI SHIMADA 3,500,315

AUTOMOTIVE VEHICLE SIGNALING SYSTEM

Filed Oct. 20, 1967

INVENTOR.
HISASHI SHIMADA
BY McGlew and Toren
ATTORNEYS

United States Patent Office

3,500,315
Patented Mar. 10, 1970

3,500,315
AUTOMOTIVE VEHICLE SIGNALING SYSTEM
Hisashi Shimada, Hoi-gun, Aichi-ken, Japan, assignor to Nippon Denso Kabushiki Kaisha, Kariya-shi, Aichi-ken, Japan
Filed Oct. 20, 1967, Ser. No. 676,921
Claims priority, application Japan, Oct. 24, 1966, 41/70,114, 41/70,115
Int. Cl. B60q 1/46, 1/00
U.S. Cl. 340—82     2 Claims

ABSTRACT OF THE DISCLOSURE

Left and right turn signal lamps comprise each three light sources which are illuminated for different durations in a cyclical manner. For this purpose three time relays each having a capacitor and two coils are so arranged that the operation of one relay is relayed to the next relay after a delay time determined by the capacity of the capacitor and the resistance of the relay coils and so on. Three sets of turn signals having different durations can also be obtained by combination of an astable multivibrator, a flip-flop circuit, an or— circuit and an and— circuit. The signal generating circuit also is so arranged that the signal lamps can be used as stop lamps, tail lamps or emergency stop lamps.

BACKGROUND OF THE INVENTION

The present invention relates to a signal apparatus for vehicles, and more particularly to a flasher signal apparatus which comprises three light sources for signalling a left or a right turn.

In the signal apparatus of this type there is provided a direct current motor which actuates a cam mechanism to make and break the circuit of signal apparatus so that the three light sources of a left or a right turn signal lamp blink on and off for different durations in a cyclic manner. Owing to its movable parts such a signal apparatus is complicated in construction and subject to a breakdown. On the other hand there is a requirement that the turn signal lamps can be used as stop lamps, tail lamps or emergency stop lamps. However, the arrangement which meets the above requirement is complicated in construction.

SUMMARY OF THE INVENTION

An object of the present invention is to provide an improved signal apparatus of the foregoing character in which three sets of turn signals having different durations are generated by combinations of three time relays.

Another object of the present invention is to provide a signal apparatus in which the turn signal lamps can be used as stop lamps, tail lamps, or emergency stop lamps.

A further object of the invention is to provide a signal apparatus in which turn signals can be generated by a combination of oscillation circuits and logic circuits.

Figure 1:
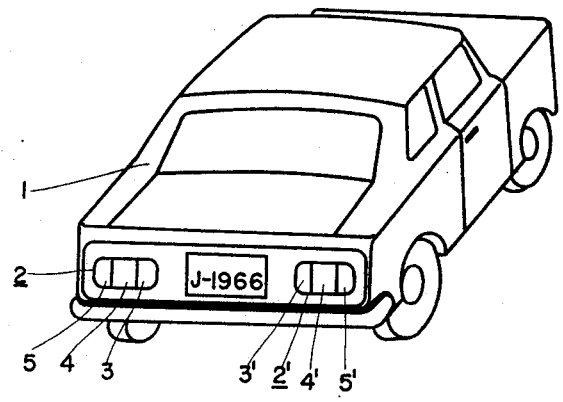
Figure 2:
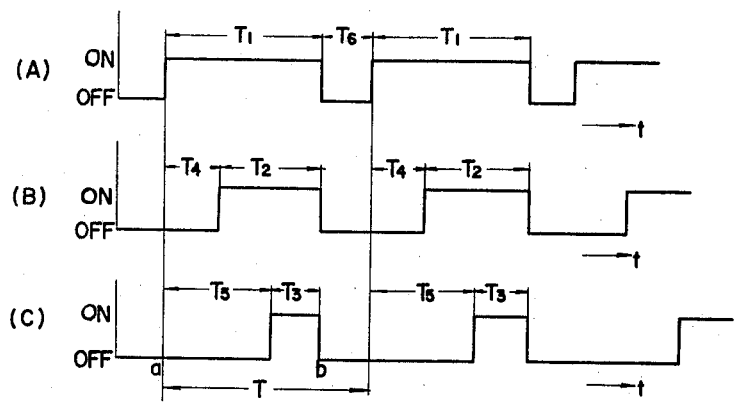
Figure 3:
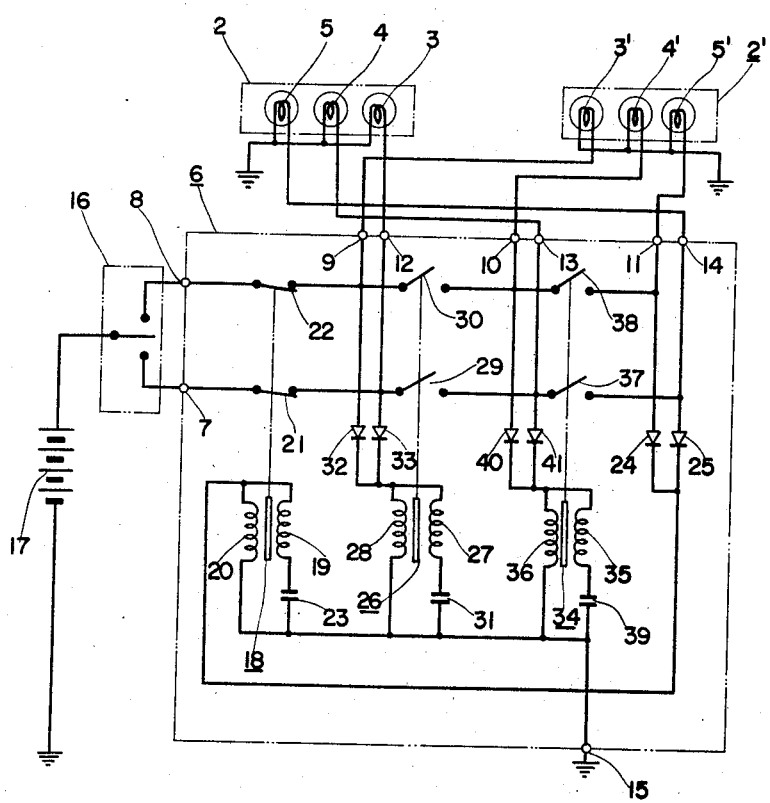
Figure 4:
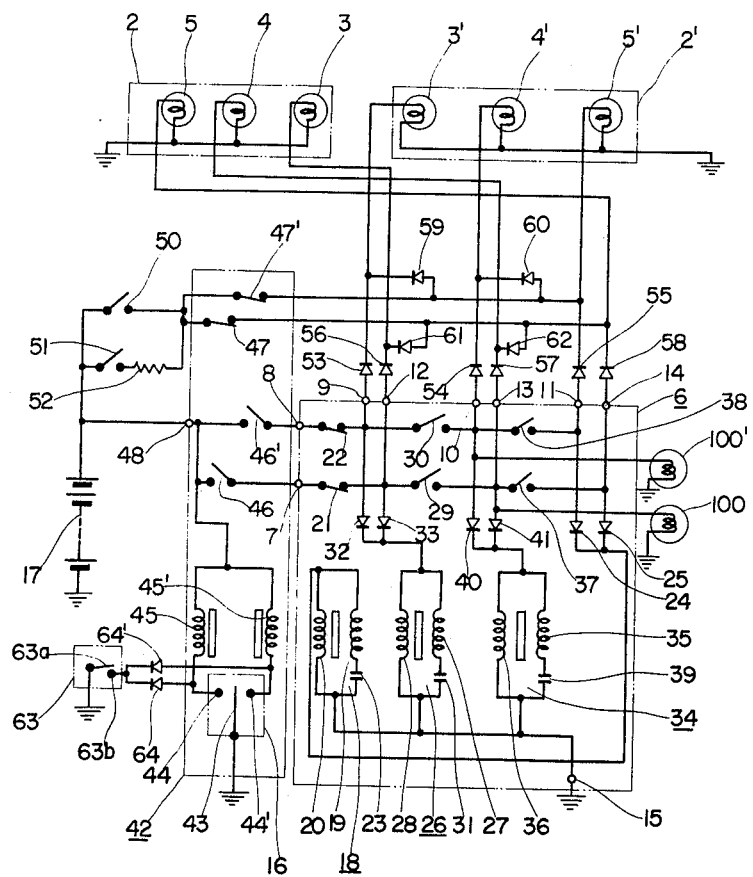
Figure 5:
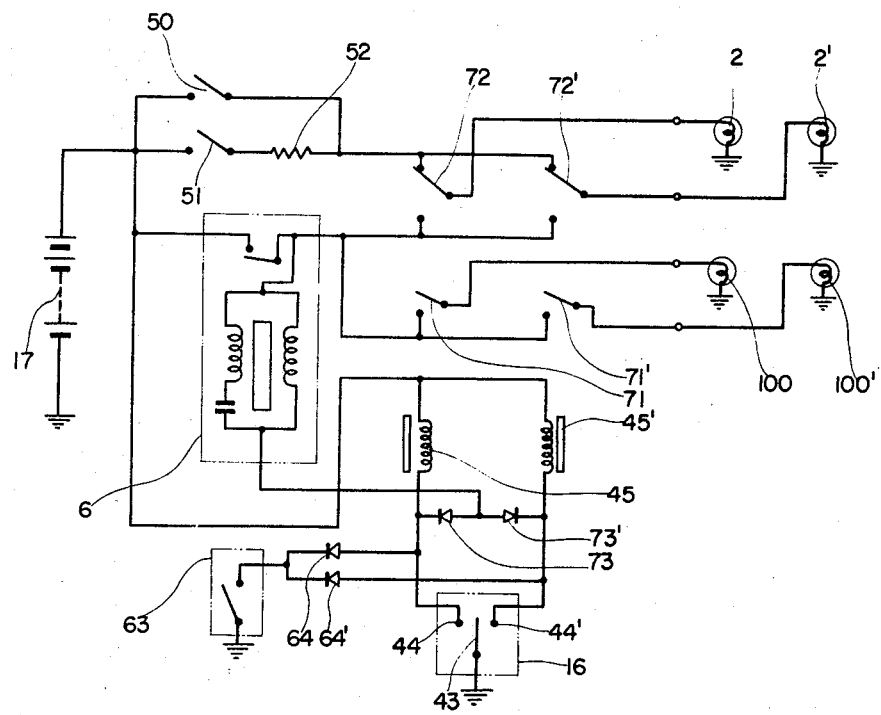
Figure 6:
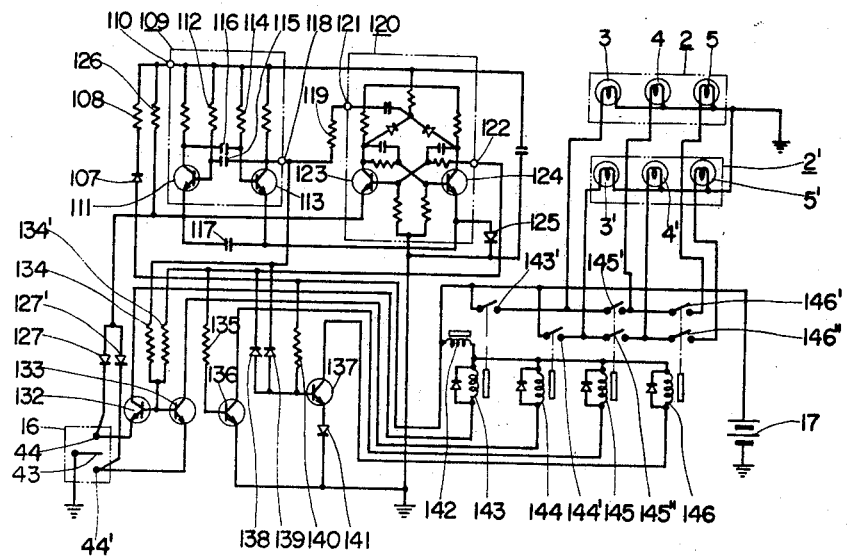
Figure 7:
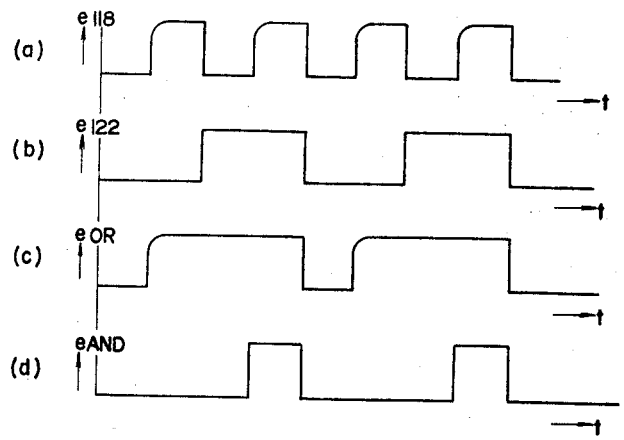

Other objects and advantages of the present invention will appear from the following description, taken with the accompanying drawings, in which:

FIG. 1 is a perspective view of a car body having turn signal lamps provided on its left and right hand, FIG. 2 is a set of curves graphically illustrating the operation of the turn signals, FIG. 3 is a connection diagram of a circuit arrangement for generating turn signals shown in FIG. 2, FIG. 4 is a connection diagram of a circuit arrangement for generating selectively turn signals, stop signals, tail signals, or emergency stop signals, FIG. 5 is a simplified connection diagram of a modification of the circuit in FIG. 4, FIG. 6 is a connection diagram of another circuit arrangement for generating turn signals, and FIG. 7 is a diagram of outputs at the parts of the circuit arrangement in FIG. 6.

In the drawings similar reference characters designate corresponding parts throughout.

Referring now to FIG. 1, signal lamps 2 and 2' for signalling a left turn and a right turn, provided on the rear portion of a car body 1, consist each of three light sources 3, 4, 5 and 3', 4', 5'. Those light sources are illuminated in accordance with the diagram shown in FIG. 2. The operation of the signal lamp 2 for signalling a left turn will now be described. When a turn signal or winker switch is thrown to the left-hand position, the first light source 3 is turned on at the moment $a$. After the predetermined delay time $T_4$ the second light source 4 is turned on. The third light source 5 is turned on the predetermined delay time $T_5$ after the first light source 3 has been turned on. Thus all the light sources 3, 4, 5 are now turned on. At the moment $b$ all the light sources 3, 4, 5 are turned off. Thus the light sources remain each turned on for the respective durations $T_1$, $T_2$, $T_3$. At the predetermined time $T_6$, the first light source 3 is turned on again, and the light sources 4, 5 are successively turned on. The above signalling operation is repeated with the period T.

A circuit arrangement for generating such signals will be described in connection with FIG. 3.

A signal generator 6 has input terminals 7, 8 one of which is connected selectively to the positive pole of an electric power source 17, such as a battery, through a turn signal switch 16, output terminals 9, 10, 11 which are connected with the light sources 3', 4', 5' of the signal lamp 2' for signalling a right turn, output terminals 12, 13, 14 which are connected with the light sources 3, 4, 5 of the signal lamp 2 for signalling a left turn and a grounding terminal 15. A first time relay 18 consists of two exciting coils 19, 20 having opposite senses of winding relative to each other, two break contacts 21, 22 and a capacitor 23 in series with the coil 19. The coil 20, and the coil 19 in series with the capacitor 23, are connected in parallel to each other, and one end of this parallel circuit is grounded while the other end thereof is connected to the output terminals 11 and 14 through diodes 24, 25, respectively. The break contact 21 lies between the input terminal 7 and the output terminal 12, while the break contact 22 lies between the input terminal 8 and the output terminal 9. A second time relay 26 consists of two exciting coils 27, 28 having opposite senses of winding relative to each other, two make contacts 29, 30 and a capacitor 31 in series with the coil 27. The coil 28, and the coil 27 in series with the capacitor 31, are connected in parallel to each other, and one end of this parallel circuit is grounded while other end thereof is connected to the output terminals 9, 12 through diodes 32, 33 respectively. The make contact 29 lies between the output terminals 12 and 13 while the make contact 30 lies between the output terminals 9 and 10. Similarly, a third time relay 34 consists of two exciting coils 35, 36 having opposite senses of winding relative to each other, two make contacts 37, 38 and a capacitor 39 in series with the coil 35. The coil 36, and the coil 35 in series with the capacitor 39, are connected in parallel to each other, and one end of this parallel circuit is grounded while other end thereof is connected to the output terminals 10, 13 through diodes 40, 41 respectively. The make contact 37 lies between the output terminals 13 and 14 while the make contact 38 lies between the output terminals 10 and 11.

The operation of the above circuit arrangement will now be explained. It is assumed that the driver throws the turn signal or winker switch 16 to the side of input terminal 7 to signal a left turn. Current from the power source 17 flows through the break contact 21 of the first time relay 18 and the output terminal 12 to the light source 3 of the signal lamp 2, for signalling a left turn, and energizes it. At the same time current from the power source 17 flows through the diode 33 to the parallel circuit of the coils 27 and 28 of the second time relay 26. The magnetic flux of the coil 27 and that of the coil 28 at first cancel each other so that the contacts 29, 30 remain open. In the process of charging the capacitor 31 the exciting current flowing through the coil 27 gradually decreases, and when the difference in flux between the coils 27 and 28 exceeds a predetermined value, the contacts 29 and 30 are brought into closed positions. The second light source 4 of the signal lamp 2 is then energized with a current flowing through the then closed contact 29 and the output terminal 13, and illuminated together with the first light source 3. The delay time $T_4$ (in FIG. 2) from the beginning of current flow through the coils 27 and 28 of the second time relay 26 to close of the contact 29 can be set arbitrarily by adjusting the capacity of the capacitor 31 and the resistance of the relay coil 27.

Simultaneously with illumination of the second light source 4, the third time relay 34 is fed with a current through the diode 41 and closes its contacts 37, 38 after a predetermined delay time in the same manner as the second time relay 26. The current flowing through the then closed contact 37 energizes the third light source 5 so that this light source is illuminated together with the light sources 3, 4. Upon closing of the contact 37, the first time relay 18 also is fed with a current through the diode 25 and opens its contacts 21, 22 after a predetermined delay time in a similar manner.

Upon opening of the contacts 21, 22, the second and third time relays 26, 34 are deenergized so that all the light sources 3, 4, 5 of the signal lamp 2 are turned off. However, owing to the discharge time constants of the capacitors 23, 31, 39 in the coil circuits, the time relays 18, 26, 34 hold their operated positions in accordance with the above discharge time constants. This will now be described in detail in connection with the first time relay 18. Upon separation of the contact 21 the capacitor 23 begins to discharge through the coils 19 and 20. The magnetic flux in the coil 19 and that in the coil 20 due to the discharge current have both the same direction so that the contact 21 is still held open by the sum of the above fluxes. Those fluxes decrease in course of discharge of the capacitor 23 so that the contact 21 finally returns to its original closed position. The other time relays 26 and 34 pursue a similar course and open their contacts 29 and 37.

The above operation is repeated so long as the winker switch 16 is thrown to the input terminal 7, and the light sources 3, 4, 5 of the signal lamp 2 blink on and off in a cyclical manner as shown in FIG. 2.

For signalling a right turn the winker or turn signal switch 16 is thrown to the side of the input terminal 8. Current from the power source 17 then flows through the contact 22, 30 and/or 38 in place of the contact 21, 29 and/or 37 and the diode 32, 40 and/or 24 in place of diode 33, 41 and/or 25 and energizes the signal lamp 2'. The operation in this case is similar to that in case of signalling a left turn so that a further description thereof is believed unnecessary.

It is preferable to use the signal lamps as stop lamps, tail lamps or emergency stop lamps, and a circuit for this is shown in FIG. 4.

In FIG. 4, for generating turn signals there is provided the same signal generator 6 as in FIG. 3, 100 and 100' designate light sources of signal lamps for signalling a left turn and a right turn which are mounted on the front portion of the car body and connected to the output terminals 10 and 13.

The winker switch or selector 16 of a direction setting circuit 42 consists of a grounded movable contact 43, a fixed contact 44 for a left turn and a fixed contact 44' for a right turn. A make contact 46 and a break contact 47 belong to a relay coil 45 while a make contact 46' and a break contact 47' belong to a relay coil 45'. The left ends of the break contacts 47 and 47' are connected with each other while the right ends are connected each to the light source 5 of the signal lamp 2 and the light source 5' of the signal lamp 2'. An input terminal 48 of the direction setting circuit 42 is connected to the positive pole of the power source 17. 50 designates a brake switch an end of which is connected to the positive pole of the power source 17 while other end thereof is connected with the junction point of the break contacts 47 and 47'. 51 designates a tail lamp switch an end of which is connected to the positive pole of the power source 17 while other end thereof is connected with the junction point of the break contacts 47 and 47' through a resistor 52.

The output terminals 9, 10, 11 and 12, 13, 14 are connected to the anodes of diodes 53, 54, 55 and 56, 57, 58, respectively the cathodes of which are each connected, respectively, to the light sources 3, 4, 5 of the signal lamp 2 and the light sources 3', 4', 5' of the signal lamp 2'. 59 and 60 designate diodes the anodes of which are connected commonly to the light source 5' while their cathodes are connected to the light sources 3' and 4', respectively. The anodes of diodes 61, 62 are connected commonly to the light source 5 while their cathodes are connected to the light sources 3 and 4, respectively. 63 designates an emergency signal switch the movable contact 63a of which is grounded while its fixed contact 63b is connected to the junction point of the cathodes of diodes 64 and 64'. The anodes of the diodes 64 and 64' are connected to the fixed contacts 44 and 44', respectively, of the winker switch 16.

When the movable contact 43 of the winker switch 16 is thrown to the contact 44 to signal a left turn, the relay coil 45 is fed with current from the power source 17 through the input terminal 48 so that the contact 46 is closed while the contact 47 is opened. Current from the power source 17 thus flows to the input terminal 7 of the signal generator 6 through the input terminal 48 and the then closed contact 46, and causes the signal lamp 2 to blink on and off in the manner as shown in FIG. 2. The light source 100 on the front portion of the car body also blinks on and off in synchronism with the light source 4.

In breaking the car, the brake switch 50 is closed upon depression of a brake pedal (not shown). The light source 5 of the signal lamp 2 is energized by the power source 17 through the brake switch 50 and the break contact 47 while the light sources 3 and 4 are also energized through the diodes 61 and 62 respectively. At the same time the light source 5' is fed with a current from the power source 17 through the break contact 47' while the light sources 3' and 4' are energized through the diodes 59 and 60 respectively. Both signal lamps 2, 2' are thus turned on in braking.

The signal lamps 2 and 2' can be used as tail lamps in the nighttime by closing the tail lamp switch 51. Upon closing the tail lamp switch 51 the signal lamps 2 and 2' are energized as in braking. Since the resistor 52 is inserted in series with the switch 51, the brightness of the lamps 2, 2' in this case is low with respect to that in braking. The resistance of the resistor 52 has its value set such that the brightness of the lamps 2, 2' used as tail lamps is only one-third of that used as stop lamps.

When the emergency signal switch 63 is closed to signal car troubles or the like, both the relay coils 45 and 45', fed with current from the power source 17 through the diodes 64 and 64' respectively, open their break contacts 47 and 47' and at the same time close the make contacts 46 and 46'. Consequently both the lamps 2 and 2' blink on and off in the manner as shown in FIG. 2. The light sources 100 and 100' on the front portion of the car body also are turned on in synchronism with the lamps 2 and 2'.

When the movable contact 43 of the winker or selector switch 16 is thrown, for example, to the left in the midst of braking, the signal lamp 2 for signalling a left turn blinks on and off while the signal lamp 2' is steadily illuminated as a stop light. A right turn in the midst of braking can be signalled similarly.

On the occasion of braking in the nighttime, the series circuit of the tail lamp switch 51 and the resistor 52 is bridged by the then closed brake switch 50 so that the lamps 2 and 2' which have been used as tail lamps increase their brightness to a value three times as high.

Turn signalling in the nighttime will be easily understood from the above descriptions.

Further, when the emergency signal switch 63 is closed, the contacts 47, 47' are opened while the contacts 46, 46' are closed. Consequently all the lamps 2, 2' 100 and 100' blink on and off to signal an emergency stop.

A modification of FIG. 4 is shown in FIG. 5. For simplification, the signal generator 6 is represented by one relay while the signal lamps 2, 2' are also represented by one light source. The grounding terminal of the relay circuit of the signal generator 6 is connected to the fixed contacts 44 and 44' of the winker switch 16 through the diodes 73 and 73' respectively. The output terminal of the signal generator 6 is connected selectively to the light source 100 or 100' through make contacts 71 or 71' which belong to the respective relay coils 45 or 45'. A change-over contact 72 which belongs to the relay coil 45 connects selectively the signal lamp 2 with either the output terminal of the signal generator 6 or the parallel circuit of the brake switch 50 and the tail lamp switch 51, while a change-over contact 72' which belongs to the relay coil 45' connects selectively the signal lamp 2' with either the output terminal of the signal generator 6 or the above mentioned parallel circuit.

Upon depression of the brake switch 50 in braking, both the signal lamps 2 and 2' are energized through the change-over contacts 72 and 72' in the position as shown, and serve as stop lamps. The signal lamps 2 and 2' are energized similarly through the resistor 52 upon close of the tail lamps switch 51, and serve as tail lamps.

When the movable contact 43 of the winker switch 16 is thrown to the contact 44 in the midst of braking, the light sources 2 and 100' are connected to the output of the signal generator 6 and blink on and off to signal a left turn while the lamp 2' remains illuminated through the contacts 72' and 50.

In case that the emergency signal switch 63 is closed, both the relay coils 45 and 45' are energized through the diodes 64 and 64' respectively, while the signal generator 6 is energized through the diodes 73 or 73' and 64 or 64'. Consequently all the lamps 2, 2' and 100, 100' are connected to the output terminal of the signal generator 6 blinking on and off to signal an emergency stop.

In FIG. 6 there is shown another circuit arrangement for generating turn signals which consists of an astable multivibrator, a flip-flop circuit, an or— circuit and an and— circuit. The positive pole of the power supply 17 is connected to the input terminal 110 of the astable multivibrator 109 through a diode 107 and a resistor 108. Between the input terminal 110 and the base of an npn-transistor 111 lies a resistor 112 while a resistor 114 is connected between the input terminal 110 and the base of an npn-transistor 113. Between the base of the transistor 111 and the collector of the transistor 113 lies a capacitor 115 while a capacitor 116 is connected between the collector of the transistor 111 and the base of the transistor 113. The emitter of the transistor 111 and that of the transistor 113 are connected with each other through a capacitor 117. The output terminal 118 of the astable multivibrator 109 is led to the input terminal 121 of the flip-flop circuit 120, of any known construction, through a resistor 119. The flip-flop circuit 120 comprises two npn-transistors 123 and 124 the emitters of which are connected to the emitters of the transistors 111 and 113, respectively, of the astable multivibrator 109. The output of the flip-flop circuit 120 is designated at 122. A diode 125, the anode of which is connected with the emitter of the transistor 124, is grounded at its cathode. A resistor 126 is inserted between the input terminal 110 and the emitter of the transistor 111. 127 and 127' designate diodes, the anodes of which are connected commonly to the emitter of the transistor 111 while their cathodes are connected to the fixed contacts 44 and 44', respectively, of the winker switch 16. The movable contact 43 of the winker switch 16 is grounded.

The or— circuit consists of two npn-transistors 132, 133 the bases of which are connected with each other. These bases are connected to the output terminal 118 of the astable multivibrator 109 through a resistor 134 on the one hand, and to the output terminal 122 of the flip-flop circuit 120 through a resistor 134' on the other hand. The emitter of the transistor 132 is connected with the fixed contact 44 of the winker switch 16 while the emitter of the transistor 133 is connected with the other fixed contact 44'.

The output terminal 122 of the flip-flop circuit 120 is connected to the base of an npn-transistor 136 through a resistor 135.

The and— circuit consists of an npn-transistor 137, diodes 138, 139, a resistor 140 and a diode 141. The anodes of the diodes 138 and 139 are connected commonly to the base of the transistor 137 while their cathodes are connected to the output 122 of the flip-flop circuit 120 and the output terminal 118 of the astable multivibrator 109, respectively. The resistor 140 lies between the base of the transistor 137 and the positive pole of the power source 17. The emitter of the transistor 137 is grounded through the diode 141.

142 designates a choke coil through which first ends of four relay coils 143, 144, 145 and 146 are connected commonly to the positive pole of the power source. The other end of the relay coil 143 is led to the collector of the transistor 132 in the or— circuit, that of the relay coil 144 to the collector of the transistor 133, that of the relay coil 145 to the collector of the transistor 136 and that of the relay coil 146 to the collector of the transistor 137 in the and— circuit. A contact 143' belongs to the relay coil 143, a contact 144' to the relay coil 144, contacts 145', 145" to the relay coil 145, and contacts 146', 146" to the relay coil 146. The series circuit of the contact 143' and the light source 3 of the signal lamp 2 is connected in parallel with the power source 17, as is also the series circuit of the contact 144' and the light source 3' of the signal lamp 2'. The series circuit of the contact 145' and the light source 4 is in parallel with the light source 3 while the series circuit of the contact 145" and the light source 4' is in parallel to the light source 3'. The series circuit of the contact 146' and the light source 5 is in parallel with the light source 4, while the series circuit of the contact 146" and the light source 4' is in parallel to the light source 5'.

The above circuit arrangement operates as follows: When the movable contact 43 of the selector or winker switch 16 is in the neutral position as shown, the transistor 113 of the astable multivibrator 109 and the transistor 124 of the flip-flop circuit 120 are both conductive, so that the potentials at the output terminals 118 and 122 are nearly zero. The transistors 132, 133, the bases of which are nearly at zero potential, are non-conductive so that the relay coils 143, 144 are not excited and hold the contacts 143', 144' open. Consequently all the light sources 3, 4, 5; 3', 4', 5' are turned off.

When the movable contact 43 is thrown to the fixed contact 44, the astable multivibrator 109 begins to oscillate and generates an output e118 as shown in FIG. 7 at its output terminal 118. Accordingly the flip-flop circuit 120 generates an output e122 at its output terminal 122. The bases of the transistors 132, 133 in the or— circuit have applied thereto both outputs e118 and e122, through resistors 134, 134', respectively. The transistor 132, the emitter of which is grounded through the contacts 44 and 43 of the winker switch 16, is rendered operative and energizes the relay coil 143 with its output eOR. The relay coil 143 actuates the contact 143' to close and open so that the light source 3 of the signal lamp 2 blinks on and off in accordance with the curve (A) of FIG. 2.

The transistor 136, the base of which is fed with the output e122 of the flip-flop circuit 120 through the resistor 135, is rendered operative and energizes the relay coil 145. Consequently the contact 145' repetitively closes and opens and causes the light source 4 to blink on and off in accordance with the curve (B) of FIG. 2.

The transistor 137 of the and— circuit supplies its output eAND to the relay coil 146 which actuates the contact 146' to close and open so that the light source 5 blinks on and off in accordance with the curve (C) of FIG. 2.

Upon separation of the movable contact 43 from the fixed contact 44, the astable multivibrator 109 stops its oscillation so that the light sources 3, 4, 5 are turned off.

When the movable contact 43 is thrown to the fixed contact 44', the light sources 3', 4', 5' are turned on similarly.

In order to avoid misoperations of the circuit, the emitter of the transistor 111 in the astable multivibrator 109, as well as the emitter of the transistor 123 in the flip-flop circuit 120, are biased to a positive potential, when the movable contact 43 of the winker switch 16 is in the neutral position. The capacitor 117 serves to avoid misoperations of the astable multivibrator 109 and the flip-flop circuit 120 due to pulses being given thereto.

The time constants of the above circuit arrangement can easily be set by selection of the resistances of the resistors 112, 114 and/or capacitors 115, 116 of the astable multivibrator 109.

What is claimed is:

1. An automotive vehicle signaling system comprising, in combination, left and right turn signal lamps, each including first, second and third light sources which, during each repetitive cycle of illumination, are energized successively and for progressively shorter durations, with all sources being deenergized substantially simultaneously at the end of each cycle; a source of potential having first and second terminals; means connecting one terminal of each light source to the first terminal of said potential source; a respective relay operated switch operatively associated with each light source and operable, when closed, to connect the other terminal of the associated light source to the second terminal of said potential source; relay means operatively associated with said switches and operable, when energized, to close associated switches; a turn signal switch, including a turn selector connected to one terminal of said potential source and selectively movable from a neutral position to engage either a contact for signaling a left turn or a contact for signaling a right turn; and timing means operatively connected to said relay means, said turn signal switch contacts and a terminal of said potential source, and operable, responsive to turn signal operation of said selector to engage a selected turn signal switch contact, to cyclically repetitively illuminate the light sources respective to the turn to be signaled; said timing means energizing said relay means to close, in timed succession during each cycle, the switches respective to the first, second and third selected light sources and to open such last-named respective switches substantially simultaneously at the end of each cycle; said timing means comprising electronic oscillator means having an input terminal connected to both contacts of said turn signal switch and to said second terminal of said source, and energized responsive to movement of said turn selector in either direction from the neutral position, said oscillator means having an output terminal; respective gating means having output circuits each connetced in series with a respective relay means and input circuits connected to said output terminal of said oscillator means; and respective timing means in each input circuit each having a respective time constant.

2. An automotive vehicle signaling system, as claimed in claim 1, in which said electronic oscillator means comprising an astable multi-vibrator and a flip-flop circuit, said multi-vibrator having said input terminal connected to both contacts of said turn signal switch and to said second terminal of said source, and an output terminal; said flip-flop circuit having an input terminal connected to the output terminal of said multi-vibrator and having an output terminal; said input circuits of said gating means being connected to both said output terminals; said gating means comprising an OR circuit including a pair of transistors each having its output circuit connected to a respective contact of said turn signal switch, and to a respective relay means controlling energization of the first light sources on respective opposite sides of the vehicle; said gating means further including a third transistor having its output circuit connected to the first terminal of said source and to the relay means controlling energization of said second light sources; said gating means including an AND circuit having its output terminal connected to the first terminal of said source and to the relay means controlling energization of said third light sources.

References Cited

UNITED STATES PATENTS

| 2,075,841 | 4/1937 | Wertheimer | 340—342 |
| 2,912,675 | 11/1959 | Habsburg-Lothringen et al. | 34—82 X |
| 3,040,207 | 6/1962 | Grontkowski. | |
| 3,274,441 | 9/1966 | Benedik | 340—342 X |
| 3,313,981 | 4/1967 | Kratochvil. | |
| 3,329,868 | 7/1967 | Domann et al. | 315—210 X |
| 3,398,399 | 8/1968 | Brock | 340—82 |

FOREIGN PATENTS 816,010   7/1959   Great Britain.

JOHN W. CALDWELL, Primary Examiner

KENNETH N. LEIMER, Assistant Examiner

U.S. Cl. X.R.

307—10, 41; 340—67